(12) United States Patent
Kachare et al.

(10) Patent No.: US 12,271,589 B2
(45) Date of Patent: *Apr. 8, 2025

(54) SYSTEM AND METHOD FOR IDENTIFYING SSDS WITH LOWEST TAIL LATENCIES

(71) Applicant: Samsung Electronics Co., Ltd., Suwon-si (KR)

(72) Inventors: Ramdas P. Kachare, Pleasanton, CA (US); Sompong Paul Olarig, Pleasanton, CA (US); Wentao Wu, Milpitas, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,641

(22) Filed: Jun. 15, 2023

(65) Prior Publication Data

US 2024/0020001 A1 Jan. 18, 2024

Related U.S. Application Data

(63) Continuation of application No. 17/356,500, filed on Jun. 23, 2021, now Pat. No. 11,714,548, which is a
(Continued)

(51) Int. Cl.
*G06F 3/06* (2006.01)
*G06F 11/30* (2006.01)
*G06F 11/34* (2006.01)

(52) U.S. Cl.
CPC ........ *G06F 3/0604* (2013.01); *G06F 11/3034* (2013.01); *G06F 11/3409* (2013.01); *G06F 11/3419* (2013.01); *G06F 11/3452* (2013.01); *G06F 11/3485* (2013.01); *G06F 3/061* (2013.01); *G06F 3/0653* (2013.01); *G06F 2201/88* (2013.01)

(58) Field of Classification Search
CPC ...... G06F 3/0604; G06F 3/061; G06F 3/0653; G06F 11/3034; G06F 11/3409; G06F 11/3419; G06F 11/3452; G06F 11/3485
See application file for complete search history.

(56) References Cited

U.S. PATENT DOCUMENTS 7,191,283 B2 3/2007 Amemiya et al.
9,043,184 B1 5/2015 Gabay et al.
(Continued)

FOREIGN PATENT DOCUMENTS

KR 20160138448 A 12/2016

OTHER PUBLICATIONS

Final Office Action for U.S. Appl. No. 15/653,479, mailed Feb. 8, 2019.
(Continued)

*Primary Examiner* — Ryan Bertram
(74) *Attorney, Agent, or Firm* — Renaissance IP Law Group LLP

(57) ABSTRACT

A storage device is disclosed. The storage device may include storage to store data and a controller to manage reading data from and writing data to the storage. The controller may also include a receiver to receive a plurality of requests, information determination logic to determine information about the plurality of requests, storage for the information about a plurality of requests, and sharing logic to share the information with a management controller.

20 Claims, 11 Drawing Sheets

Related U.S. Application Data continuation of application No. 16/697,177, filed on Nov. 26, 2019, now Pat. No. 11,073,987, which is a continuation of application No. 15/653,479, filed on Jul. 18, 2017, now Pat. No. 10,545,664.

(60) Provisional application No. 62/484,387, filed on Apr. 11, 2017.

(56) References Cited

U.S. PATENT DOCUMENTS

| | | | |
|---|---|---|---|
| 9,417,803 | B2 | 8/2016 | Sandel et al. |
| 9,418,088 | B1 | 8/2016 | Noll |
| 9,423,967 | B2 | 8/2016 | Colgrove et al. |
| 9,471,517 | B1 | 10/2016 | Yoon |
| 9,541,987 | B2 | 1/2017 | Cooper |
| 9,563,502 | B1 | 2/2017 | Alhussien et al. |
| 9,582,058 | B2 | 2/2017 | Lucas et al. |
| 2007/0011330 | A1 | 1/2007 | Dinker et al. |
| 2012/0072798 | A1 | 3/2012 | Unesaki et al. |
| 2013/0179631 | A1 | 7/2013 | Cepulis |
| 2013/0239111 | A1 | 9/2013 | Bingham et al. |
| 2014/0215177 | A1 | 7/2014 | Kim et al. |
| 2014/0324862 | A1 | 10/2014 | Bingham et al. |
| 2015/0169221 | A1 | 6/2015 | Shirasu |
| 2015/0254088 | A1 | 9/2015 | Chou et al. |
| 2015/0331473 | A1 | 11/2015 | Jreji et al. |
| 2017/0004193 | A1 | 1/2017 | Shraer et al. |
| 2017/0031857 | A1 | 2/2017 | Qiu |
| 2017/0102874 | A1 | 4/2017 | Ouchi et al. |
| 2017/0132169 | A1 | 5/2017 | Nelogal et al. |
| 2018/0083854 | A1 | 3/2018 | Munjal et al. |
| 2018/0095904 | A1 | 4/2018 | Bunker et al. |
| 2018/0165016 | A1 | 6/2018 | Malina et al. |
| 2018/0253500 | A1 | 9/2018 | Ranjan et al. |
| 2018/0260135 | A1 | 9/2018 | Hayashida et al. |
| 2018/0284011 | A1 | 10/2018 | Farkas et al. |
| 2018/0288090 | A1 | 10/2018 | Olarig et al. |
| 2018/0293147 | A1 | 10/2018 | Bikumala et al. |
| 2018/0293171 | A1 | 10/2018 | Joshi et al. |

OTHER PUBLICATIONS

Notice of Allowance for U.S. Appl. No. 15/653,479, mailed Sep. 18, 2019.
Notice of Allowance for U.S. Appl. No. 16/697,177, mailed Mar. 23, 2021.
Notice of Allowance for U.S. Appl. No. 17/356,500, mailed Mar. 14, 2023.
Office Action for U.S. Appl. No. 15/653,479, mailed Aug. 13, 2018.
Office Action for U.S. Appl. No. 15/653,479, mailed Jun. 13, 2019.
Office Action for U.S. Appl. No. 16/697,177, mailed Jan. 7, 2021.
Office Action for U.S. Appl. No. 17/356,500, mailed Nov. 17, 2022.

SYSTEM AND METHOD FOR IDENTIFYING SSDS WITH LOWEST TAIL LATENCIES

RELATED APPLICATION DATA

This application is a continuation of U.S. patent application Ser. No. 17/356,500, filed Jun. 23, 2021, now allowed, which is a continuation of U.S. patent application Ser. No. 16/697,177, filed Nov. 26, 2019, now U.S. Pat. No. 11,073,987, issued Jul. 27, 2021, which is a continuation of U.S. patent application Ser. No. 15/653,479, filed Jul. 18, 2017, now U.S. Pat. No. 10,545,664, issued Jan. 28, 2020, which claims the benefit of U.S. Provisional Patent Application Ser. No. 62/484,387, filed Apr. 11, 2017, all of which are incorporated by reference herein for all purposes.

FIELD

The inventive concepts relate generally to Solid State Drives (SSDs), and more particularly to managing SSDs of differing performance capabilities.

BACKGROUND

For hyperscalers, the non-deterministic behaviors of Solid State Drives (SSDs), and especially tail latency, are a major issue. Tail latency—the worst case or near-worst case performance of a storage device—may have a detrimental impact on the overall performance of a hyperscaled application, even though tail latency may affect only a small percentage of requests.

To counter problems such as tail latency, hyperscalers may and do request specific functionality in the storage devices they use. But different storage device vendors may implement the functionalities in different ways. As a result, the performance of those functionalities in the storage devices may vary across vendors, and even across storage devices offered by a particular vendor.

It might be possible for a single vendor to classify the storage devices it offers based on the performance of these functionalities. For example, a single vendor might be able to classify its storage devices based on tail latency identifying particular storage device offerings as offering top-tier, middle-tier, and lowest-tier performance. It might even be possible for vendors to agree on a standard for classifying storage devices, so that a "top-tier" storage device from one vendor might be considered comparable to a "top-tier" storage device from another storage vendor.

But there are problems with this approach. First, different storage devices may offer different functionality. If one storage device model from one vendor implements two different requested functionalities and another storage device model from another vendor implements only one requested functionality, should those two storage device models be considered comparable? Second, manufacturing variabilities might result in varying performance levels even within a particular storage device model from a single vendor, meaning that two different devices of the same model might be more appropriately classified differently, a fact that might not be determined without rigorous testing of the storage devices. Third, using a "one size fits all" classification system might not meet the needs of individual hyperscalers. With enterprises leasing computing resources more and purchasing their own servers less, vendors are more likely to need to vary their workloads for different subscribers.

A need remains for a way to determine the performance characteristics of storage devices for classification by data centers.

DETAILED DESCRIPTION

Figure 1:
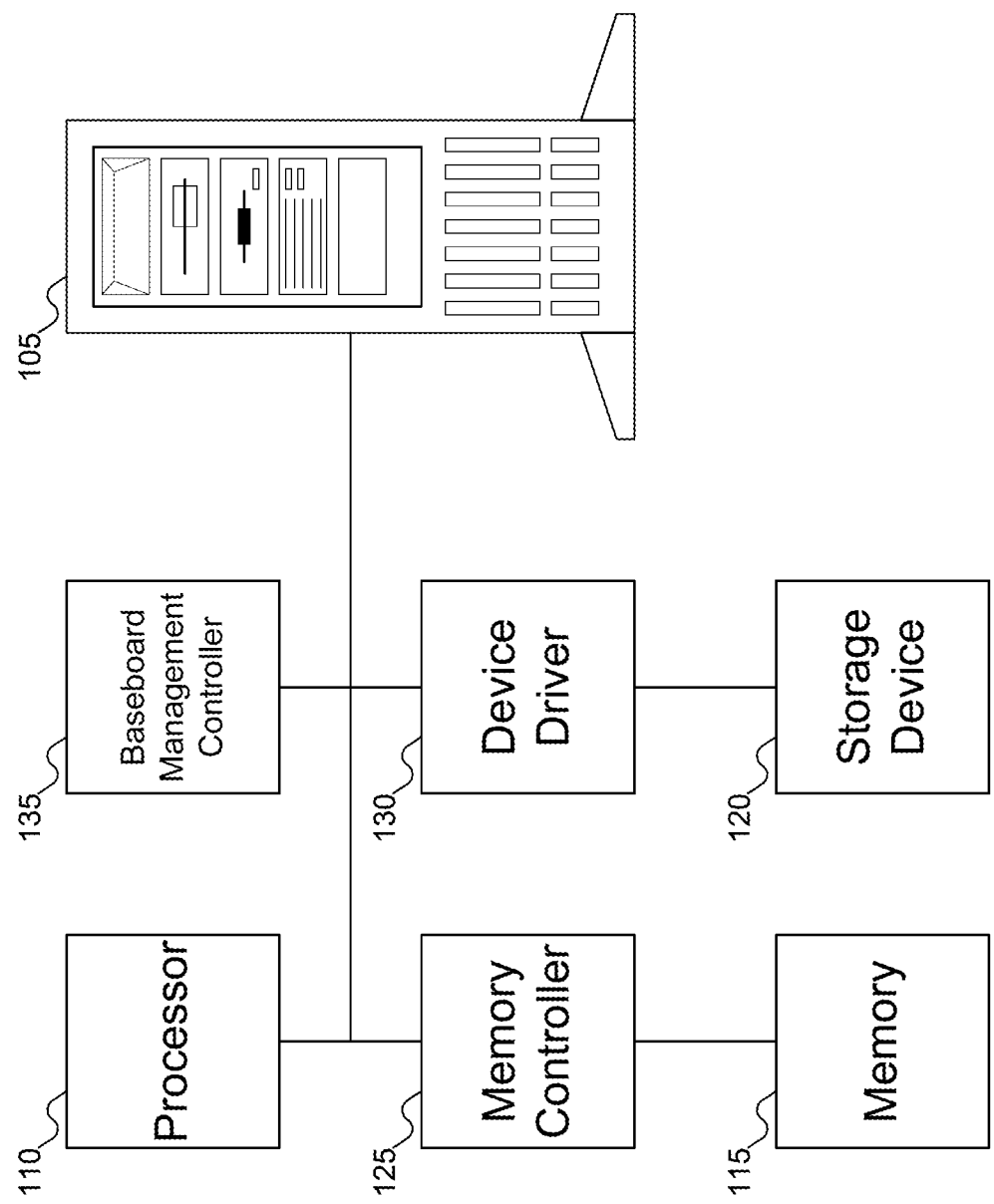
FIG. 1 shows a machine with a storage device and a Baseboard Management Controller (BMC), according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

To address the problems of the prior art, a management controller, such as a Baseboard Management Controller (BMC) may manage and keep track of all Solid State Drives (SSDs) residing in the chassis. Each SSD device may track all completed transactions in terms of the actual time required to complete a transaction. Collectively, device latency counter(s) inside each SSD controller may keep track of all transactions for each application/host. Each SSD may periodically report back to the BMC.

Hyperscalers/users may use the information from the BMC to determine how to allocate storage resources (i.e., SSDs) by matching storage resources to the applications' latency requirements and leasing/subscription rates. Embodiments of the inventive concept would enable customers who are willing to pay a higher fee in order to have the lowest tail latency storage, and enable service providers such as AWS, Google, and Azure to offer better solutions for higher fees.

Embodiments of the inventive concept may use a BMC to collect latency information from all SSDs residing in the same chassis. Before allocating computing and storage resources, a cloud-based service provider may retrieve the needed information from the BMC. Thereafter, the service provider may easily identify and match computing and storage resources for certain premium users. For example, the BMC may identify its own SSDs with lowest latency for "Platinum," mid-range latency for "Gold", and highest latency for "Bronze" rates respectively.

An SSD may perform the following functions:
Collect device info periodically.
Collect raw device information and input them in a known data base format.
Export device info to Host. The SSD may support passive export by waiting for the BMC to query the SSD, after which the SSD assembles the requested information and returns it to the BMC, or active export by writing the device information into a Controller Memory Buffer that the BMC may access.
Support device info sync mechanism by version and/or timestamp, to avoid repeated sharing of the same information.
Support device information security by either data encryption or authorization, to prevent unauthorized parties from accessing the device information.

FIG. 1 shows a machine with a Solid State Drive (SSD) and a Baseboard Management Controller (BMC), according to an embodiment of the inventive concept. In FIG. 1, computer machine 105 is shown. Computer machine 105 may be any desired machine, including without limitation a desktop or laptop computer, a server (either a standalone server or a rack server), or any other device that may benefit from embodiments of the inventive concept. Computer machine 105 may also include specialized portable computing devices, tablet computers, smartphones, and other computing devices. Computer machine 105 may run any desired applications: database applications are a good example, but embodiments of the inventive concept may extend to any desired application.

Computer machine 105, regardless of its specific form, may include processor 110, memory 115, and Solid State Drive (SSD) 120. Processor 110 may be any variety of processor: for example, an Intel Xeon, Celeron, Itanium, or Atom processor, an AMD Opteron processor, an ARM processor, etc. While FIG. 1 shows a single processor, computer machine 105 may include any number of processors, and each processor may include any number of cores. Memory 115 may be any variety of memory, such as storage, Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc., but is typically Dynamic Random Access Memory (DRAM). Memory 115 may also be any desired combination of different memory types. Memory 115 may be controlled by memory controller 125, also part of computer machine 105.

Storage device 120 may be any variety of storage device: for example, a hard disk drive or a Solid State Drive (SSD). Embodiments of the inventive concept may include any variety of storage device capable of providing the information used to manage storage devices. Thus, while this document and the drawings might focus at times on SSDs as storage devices, the use of SSDs is merely exemplary, and the concepts described herein may be extended to any storage device capable of providing the information used to manage the storage devices. Storage device 120 may be controlled by device driver 130, which may reside within memory 115. While FIG. 1 shows only one storage device 120, computer machine 105 may include any number of storage devices, and each storage device may be of any desired type (such as hard disk drives and SSDs).

Baseboard Management Controller (BMC) 135 is used in servers, PCs, switches and other computer-based products. Generally speaking, BMC 135 communicates with sensors, measuring internal physical variables such as temperature, humidity, power-supply voltage, fan speeds, communications parameters, and operating system (OS) functions. If any of these variables happens to stray outside specified limits, the administrator may be notified. That person may then take corrective action by remote control. In some cases, BMC 135 may take some corrective actions such as increasing fan speeds or rebooting the failed subsystems. The monitored device/system may be power cycled or rebooted remotely, as necessary and/or appropriate. In this way, a single administrator may remotely manage numerous servers and other devices simultaneously, saving on the overall operating cost of the network and helping to ensure its availability.

Because BMC 135 is connected to various components of computer machine 105, which may include storage device 120, BMC 135 may be used to control these components. This control may include accessing the characteristics of storage device 120. These characteristics may then be used to determine which storage device is the "best fit" for storing data relating to a particular application running on computer machine 105 (or another connected machine). While FIG. 1 refers specifically to Baseboard Management Controller 135, embodiments of the inventive concept may be extended to any management controller that may perform the operations described herein.

Figure 2:
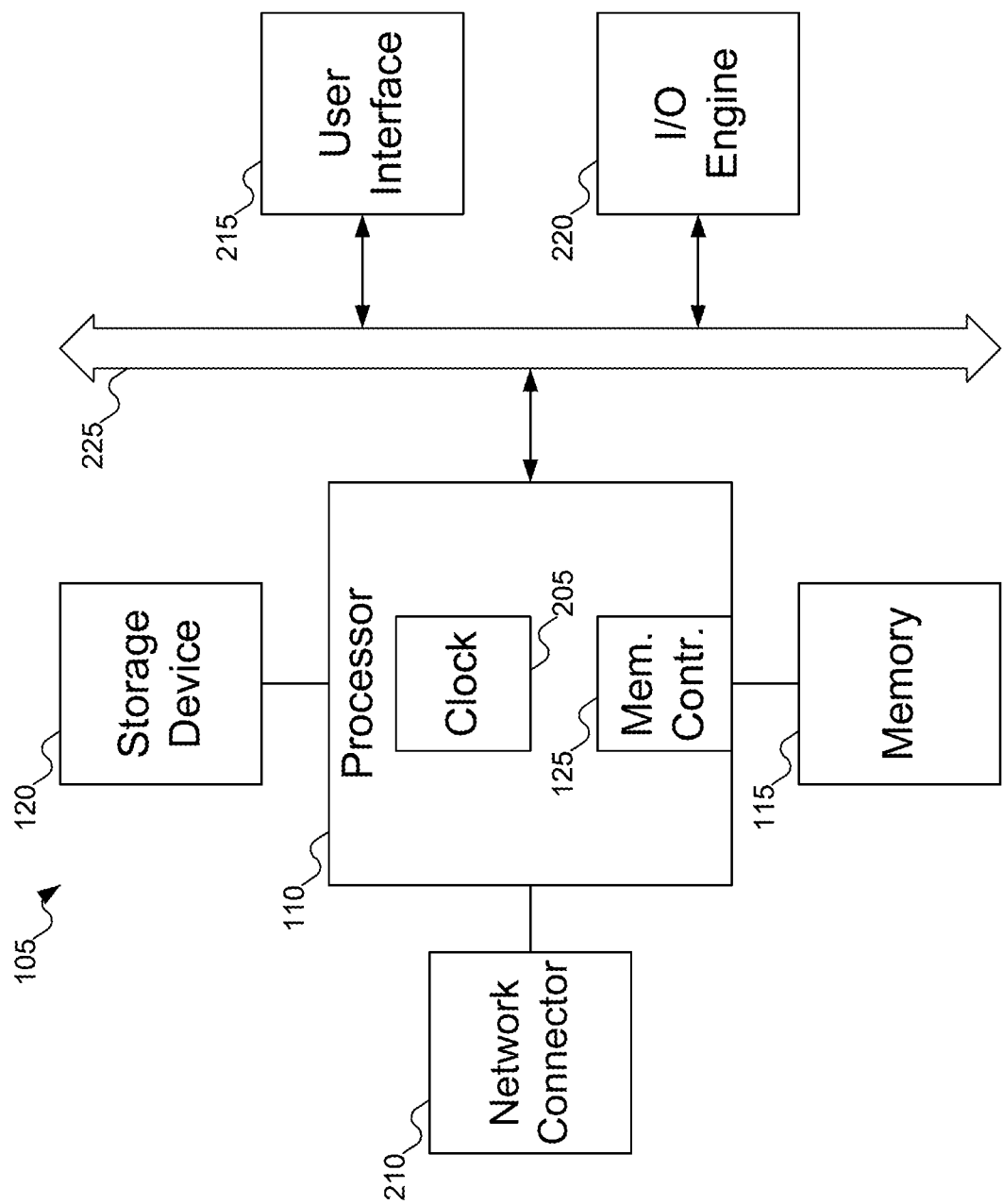
FIG. 2 shows additional details of the machine of FIG. 1.

FIG. 2 shows additional details of computer machine 105 of FIG. 1. Referring to FIG. 2, typically, computer machine 105 includes one or more processors 110, which may include memory controller 125 and clock 205, which may be used to coordinate the operations of the components of computer machine 105. Processors 110 may also be coupled to memory 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to a bus 225, to which may be attached user interface 215 and Input/Output interface ports that may be managed using Input/Output engine 220, among other components.

Figure 3:
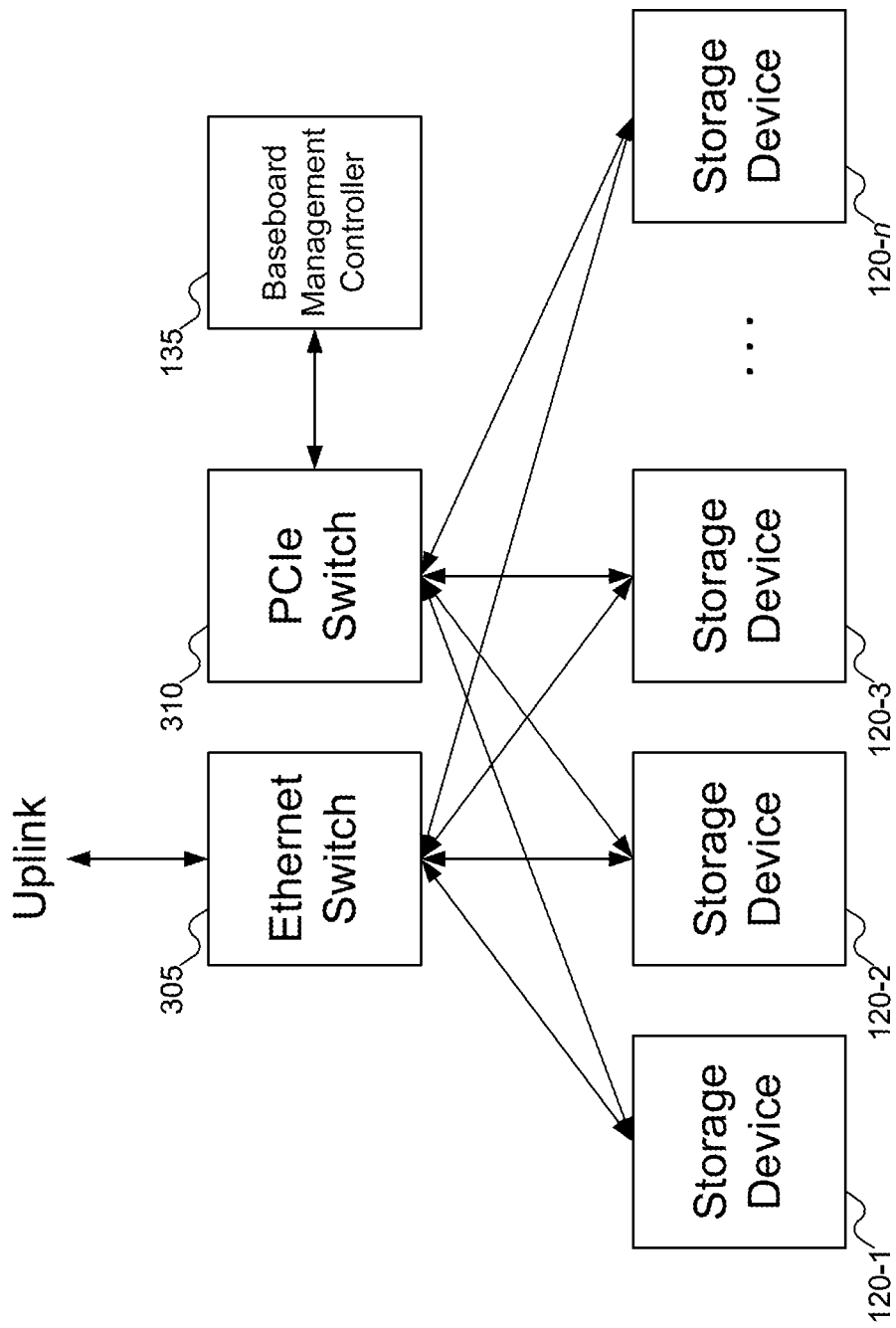
FIG. 3 shows several storage devices in the machine of FIG. 1 managing control communications with the BMC of FIG. 1.

FIG. 3 shows several SSDs in computer machine 105 of FIG. 1 managing control communications with BMC 135 of FIG. 1. In FIG. 3, storage devices 120-1 through 120-*n* are shown. While FIG. 3 shows four storage devices 120-1 through 120-*n*, embodiments of the inventive concept may support any number of storage devices. Each of storage devices 120-1 through 120-*n* may communicate with Ethernet switch 305 and Peripheral Component Interconnect Express (PCIe) switch 310, which may communicate with BMC 135. Ethernet switch 305 may be used to communicate with storage devices 120-1 through 120-*n* over a data plane, whereas PCIe switch 310 may be used to communicate with storage devices 120-1 through 120-*n* over a control plane. For example, as described in U.S. patent application Ser. No. 15/256,495, filed Sep. 2, 2016, which claims the benefit of U.S. Provisional Patent Application Ser. No. 62/366,622, filed Jul. 26, 2016, U.S. patent application Ser. No. 15/345,507, filed Nov. 7, 2016, which claims the benefit of U.S. Provisional Patent Application Ser. No. 62/394,726, filed Sep. 14, 2016, U.S. patent application Ser. No. 15/345,509, filed Nov. 7, 2016, which claims the benefit of U.S. Provisional Patent Application Ser. No. 62/394,727, filed Sep. 14, 2016, and U.S. patent application Ser. No. 15/690,270, filed Aug. 29, 2017, which claims the benefit of U.S. Provisional Patent Application Ser. No. 62/501,087, filed May 3, 2017 all of which are incorporated by reference herein, BMC 135 may act as a proxy device to communicate with storage devices 120-1 through 120-*n* regarding their configurations. BMC 135 may also communicate with storage devices 120-1 through 120-*n* (and other devices as well) for other reasons, without limitation.

In embodiments of the inventive concept, storage devices 120-1 through 120-*n* may collect information about their operation. This information may be reported to BMC 135 via the control plane over PCIe switch 310. In this manner, communications with BMC 135 do not interfere with communications over the data plane via Ethernet switch 305. Embodiments of the inventive concept may use other desired communication paths for the control plane. For example, the control plane between BMC 135 and storage devices 120-1 through 120-*n* may use the System Management Bus (SMBus), rather than PCIe switch 310. Any reference to PCIe switch 310 should be understood to include alternative control planes like SMBus.

In FIG. 3, it is assumed that storage devices 120-1 through 120-*n* use an Ethernet connection to communicate over the data plane. But other embodiments of the inventive concept may support other forms of communication over the data plane without limitation. For example, the data plane might use Serial Attached Small Computer Systems Interface (SAS) for communication rather than Ethernet. In such embodiments of the inventive concept, Ethernet switch 305 may be replaced with any appropriate equivalent component, such as an SAS Expander. In addition, the PCIe lanes supported by PCIe switch 310 may be divided into two (or more) sets of lanes, with one set dedicated to communications over the control plane and another set dedicated to communications over the data plane, or for communicating with two motherboards (sometimes also termed switchboards) in computer machine 105. In such embodiments of the inventive concept where communications over both the data and control planes are supported by PCIe switch 310, as in Non-Volatile Memory Express (NVMe) systems, Ethernet switch 305 may be omitted.

Figure 4:
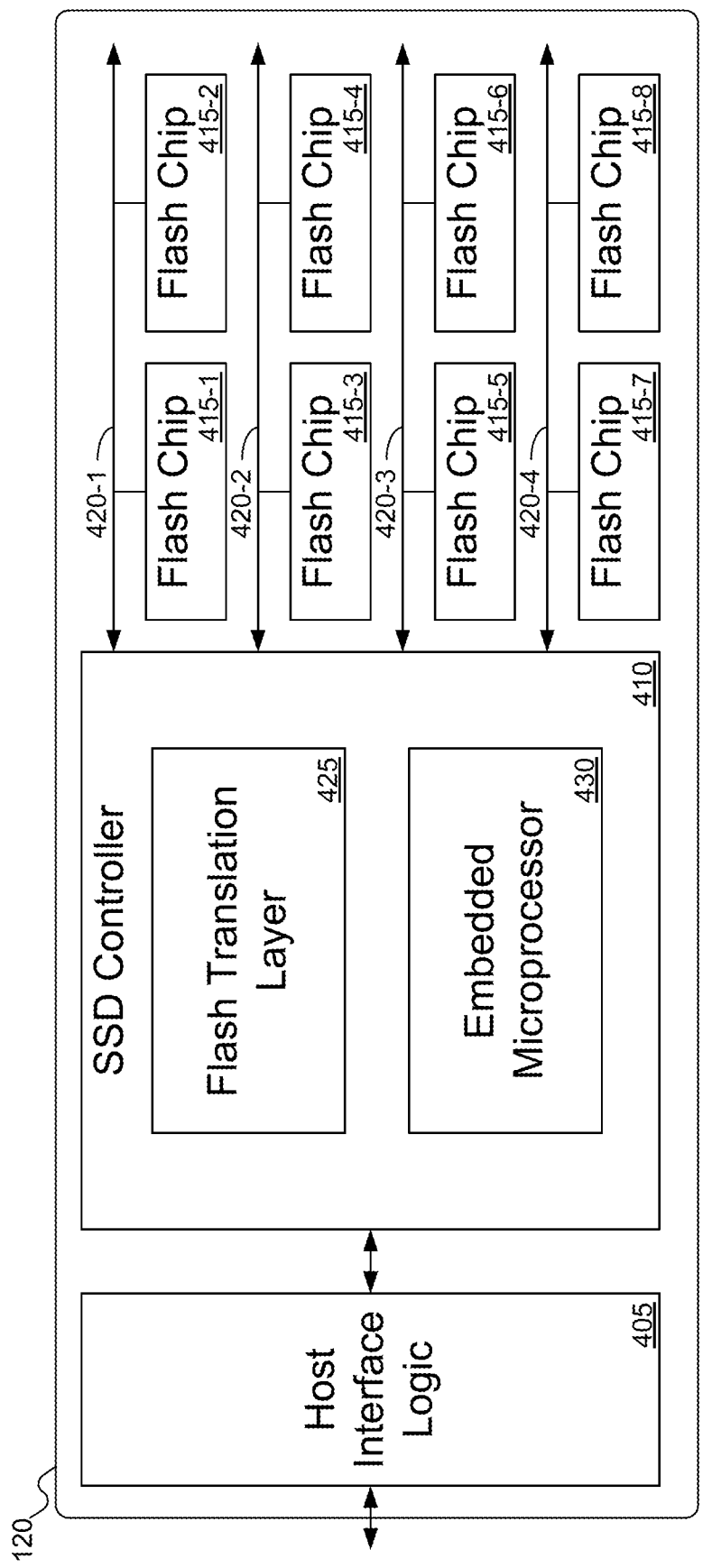
FIG. 4 shows details of a Solid State Drive (SSD) as the storage device of FIG. 1.

FIG. 4 shows details of an SSD as storage device 120 of FIG. 1. In FIG. 4, SSD 120 may include host interface logic 405, SSD controller 410, and various storage chips 415-1 through 415-8, which may be organized into various channels 420-1 through 420-4. Host interface logic 405 may manage communications between SSD 120 and computer machine 105 of FIG. 1. SSD controller 410 may manage the read and write operations, along with garbage collection operations, on storage chips 415-1 through 415-8. SSD controller 410 may include flash translation layer 425 to perform some of this management. While FIG. 4 shows SSD 120 as including eight storage chips 415-1 through 415-8 organized into four channels 420-1 through 420-4, embodiments of the inventive concept may support any number of storage chips organized into any number of channels.

SSD controller 410 may also include embedded microprocessor 430. Embedded microprocessor 430 may be any desired processor included within SSD 120. Embedded microprocessor 430 may run applications on behalf of computer machine 105 of FIG. 1.

Figure 5:
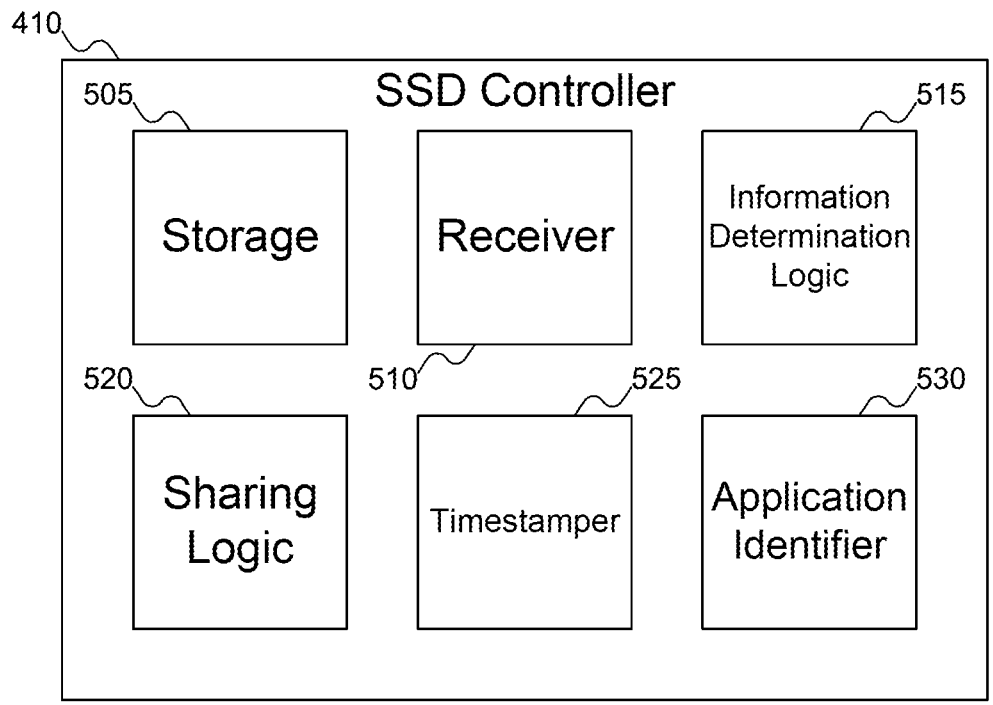
FIG. 5 shows details of the SSD controller of FIG. 4.

FIG. 5 shows details of SSD controller 410 of FIG. 4. SSD controller 410 may be logically or conceptually generalized to a controller operative for any storage device; SSD controller 410 is shown merely as an example. In FIG. 5, SSD controller 410 may include storage 505, receiver 510, information determination logic 515, and sharing logic 520. Storage 505 may store information about a plurality of requests. As will be described below with reference to FIG. 8, such "information" may be any information about the operation of storage device 120 of FIG. 1. In addition, "information" may be extended to include information about the storage device, without being specifically about requests processed by storage device 120. Receiver 510 may receive requests from applications. Information determination logic 515 may determine the information about the requests/ storage device that is then stored in storage 505. Sharing logic 520 may then share that information with BMC 135 of FIG. 1.

SSD controller 410 may also include timestamper 525. Timestamper 525 may apply a timestamp to the information stored in storage 505. The timestamp may then be used to filter what information is provided to BMC 135 of FIG. 1. For example, the timestamp may be used to identify what information is more recent than the time at which information was last shared with BMC 135.

SSD controller 410 may also include application identifier 530. Application identifier 530 may identify an application from which a particular request was received. For example, if embedded microprocessor 430 of FIG. 4 is running an application on behalf of computer machine 105, computer machine 105 might not know the source of requests executed by SSD 120. In some embodiments of the inventive concept, storage device 120 of FIG. 1 may report to BMC 135 of FIG. 1 which applications have issued requests executed by storage device 120. Application identifier 530 may provide this information. Application identifier 530 may operate similarly to an operating system running on processor 110 of FIG. 1 on computer machine 105 of FIG. 1 by tracking which applications have issued requests executed by storage device 120 of FIG. 1.

Figure 6:
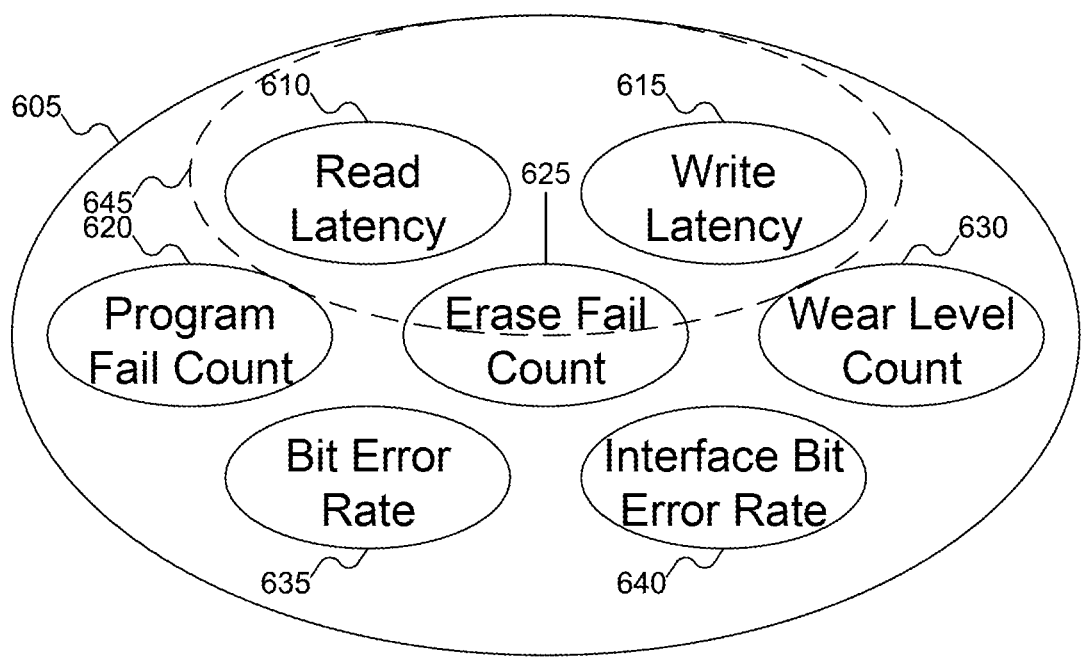
FIG. 6 shows various information that may be tracked about the storage device of FIG. 1.

FIG. 6 shows various information that may be tracked about the SSDs of FIG. 1. In FIG. 6, set 605 depicts various information that may be tracked by storage device 120 of FIG. 1. Set 605 may include various information, such as:

- Read latencies 610: how long it takes storage device 120 of FIG. 1 to execute and complete a read request. Read latency 610 may measure the time from when storage device 120 of FIG. 1 receives the read request until the time when storage device 120 of FIG. 1 sends back the requested data.
- Write latencies 615: how long it takes storage device 120 of FIG. 1 to execute and complete a write request. Write latency 615 may measure the time from when storage device 120 of FIG. 1 receives the write request until the time when storage device 120 of FIG. 1 sends back an acknowledgment of successful write result.
- Program fail count 620: how many times write requests failed due to problems writing the data.
- Erase fail count 625: how many times a SSD failed to successfully erase a block.
- Wear level count 630: how many times a SSD has performed wear leveling on an individual block.
- Bit error rate 635: the rate at which bit errors have been detected and/or corrected by storage device 120 during read and/or write requests.
- Interface bit error rate 640: the rate at which bit errors have been detected and/or corrected by storage device 120 when receiving data at storage device 120 of FIG. 1 from computer machine 105 of FIG. 1. Interface bit error rate 640 may also be termed "end-to-end error detection count".

Set 605 represents some possible data that may be tracked by storage device 120 of FIG. 1. Set 605 is not intended to represent a complete list of all possible information that may be tracked by storage device 120: embodiments of the inventive concept may track other information as well, as described (but not limited by) below:

- Cyclic Redundancy Check (CRC) error count: how many errors are detected using a CRC. Embodiments of the inventive concept may replace CRC with any other error detection and/or error correction approach.
- Timed workload information: information about the workload of computer machine 105 and other hosts sending requests to storage device 120. Time workload information may include media wear (the amount of wear of storage device 120 of FIG. 1 attributable to an individual host), host read percentage (overprovisioning attributable to an individual host), and a timer (how long to retry requests for a particular host before failing the request).
- Thermal throttle status: information about the current thermal status of storage device 120. If the thermal sensors on storage device 120 of FIG. 1 are over their limits, the power provided to storage device 120 of FIG. 1 may be reduced to lower the heat generated by storage device 120 of FIG. 1.
- Retry buffer overflow counter: a count of how many times read and/or write requests have been retried due to failures.
- Physical Link Lock (PLL) loss count: a count of how many times an error has occurred that was attributable to the physical link between storage device 120 of FIG. 1 and computer machine 105 of FIG. 1.
- NAND bytes written: a count of how many bytes have been written to NAND flash memory in SSD 120 of FIG. 4.
- Host bytes written: a count of how many bytes have been written to storage device 120 of FIG. 1 that are attributable to an individual host.
- Current temperature: a track of the current temperature of storage device 120 of FIG. 1.
- Overtemp shutdown flag: an indicator of whether storage device 120 of FIG. 1 has been shut down because its temperature exceeded a maximum operating temperature. Overtemp shutdown flag may track which component last triggered a shutdown, or which component had the highest over-temperature that triggered a shutdown.
- Highest and/or lowest temperature: a track of the highest and/or lowest temperatures detected for storage device 120 of FIG. 1 during operation.
- Specified minimum and/or maximum operating temperature: the minimum and/or maximum operating temperatures at which storage device 120 of FIG. 1 is expected to operate.
- Time under thermal throttling condition: a count of the number of units of time (which may be seconds, minutes, or any other desired units) during which storage device 120 of FIG. 1 has been subject to thermal throttling (for being over temperature but not yet requiring shutdown).
- Number of times under thermal throttling condition: a count of the number of times storage device 120 of FIG. 1 has begun thermal throttling.
- Number of unrecoverable read and/or write errors: a count of the number of uncorrectable read and/or write errors that have been detected.
- Warning media and data integrity errors: types of errors that may occur during end-to-end communications between storage device 120 of FIG. 1 and computer machine 105 of FIG. 1.
- Number of Garbage Collection-related block erase operations: a count of the number of blocks that have been erased during Garbage Collection on SSD 120 of FIG. 4 (this information is applicable to any storage device 120 of FIG. 1 that performs Garbage Collection: not every type of storage device 120 of FIG. 1 performs Garbage Collection).
- Estimated time to complete Garbage Collection to maintain free erase block count threshold: an estimate of the amount of time needed to perform Garbage Collection to raise the free erase block count of SSD 120 of FIG. 4 to a threshold level.
- Latency buckets: storage device 120 of FIG. 1 may track latencies for read and/or write requests using buckets of various widths. These widths may vary in any desired manner. For example, one embodiment of the inventive concept may use buckets that are 32 μs wide for latencies between 0 ms and 1 ms, buckets that are 1 ms wide for latencies between 1 ms and 32 ms, and buckets that are 32 ms wide for latencies between 32 ms and 1 second.
- Error count: a count of the number of errors that have occurred.
- Error timestamp: a timestamp for when each error has occurred.
- Request opcode, status field, additional information, affected Logical Block Address (LBA), affected namespace, and affected port: information about the request being performed when an error occurred.
- Error log information overflow flag: an indicator whether there is additional information stored in an overflow error log.
- Active namespace count: a count of the number of active namespaces being supported by storage device 120 of FIG. 1.

Host read and/or write request sizes: storage device 120 of FIG. 1 may track the sizes of read and/or write requests using buckets of various widths. These widths may vary in any desired manner. For example, one embodiment of the inventive concept may track request sizes of 0 kb-4 kb, 4 kb-8 kb, 8 kb-16 kb, 16 kb-32 kb, 32 kb-64 kb, 64 kb-128 kb, 128 kb-256 kb, and greater than 256 kb. Storage device 120 of FIG. 1 may also track a percentage of random read and/or write requests for each bucket.

Link configuration trained, interface-related errors, number of hardware queues configured, number of interrupt vectors configured, link level parameters (such as Maximum Transmission Unit (MTU), maximum payload size, and so on): various information relating to the link between storage device 120 of FIG. 1 and computer machine 105 of FIG. 1.

Stream-related information: storage device 120 of FIG. 1 may track information relating to its use of streams, in support of multi-streaming.

While storage device 120 of FIG. 1 may track all the information shown in FIG. 6 (and other information not shown in FIG. 6 as well), storage device 120 of FIG. 1 is not required to track all this information. For example, storage device 120 of FIG. 1 might track only read latencies 610 and write latencies 615, as shown by subset 645. Embodiments of the inventive concept may support storage device 120 of FIG. 1 tracking any desired subset of the available information.

Figure 7:
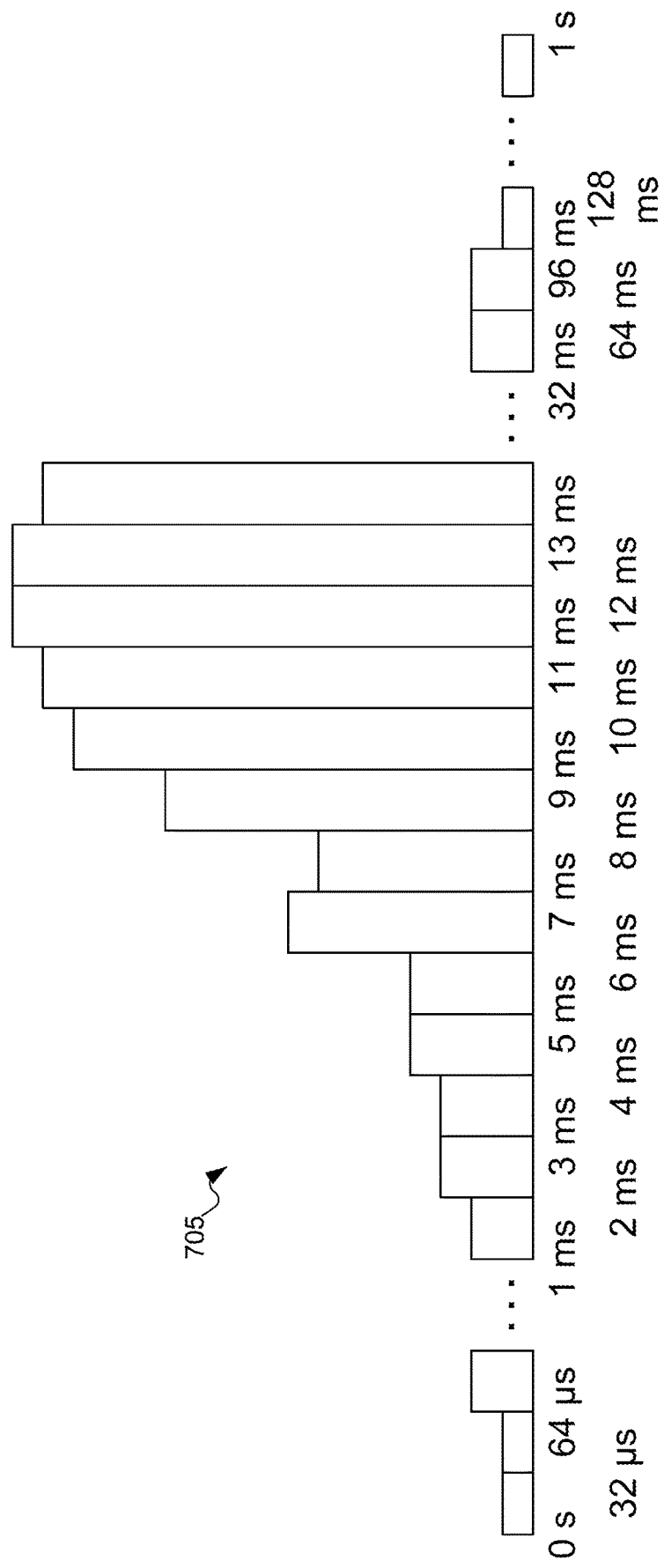
FIG. 7 shows details about read latencies of requests in the storage device of FIG. 1.

FIG. 7 shows details about read latencies of requests in storage device 120 of FIG. 1. In FIG. 7, various latency buckets are shown in histogram 705. These buckets span latencies ranging from 0 seconds (generally unrealistic unless storage device 120 of FIG. 1 happens to have very fast memory acting as a cache) to 1 second (an unusually long amount of time to return data). Buckets between 0 seconds and 1 ms are each 32 μs wide; buckets between 1 ms and 32 ms are each 1 ms wide, and buckets between 32 ms and 1 second are 32 ms wide. Generally, the shape of histogram 705 is expected to be approximately a bell curve (or Gaussian distribution), although other distributions are possible and might be expected. The exact shape may vary, as may the mean and standard deviation of histogram 705.

Histogram 705 shows some of the information that may be sent from storage device 120 of FIG. 1 to BMC 135 of FIG. 1. But it is understood that histogram 705 does not include the base information: instead, histogram 705 provides some statistics generated about the base information. That is, rather than providing the base information, statistics may be generated from the base information: these statistics (such as histogram 705) may then be provided to BMC 135 of FIG. 1 instead of the base information.

Figure 8:
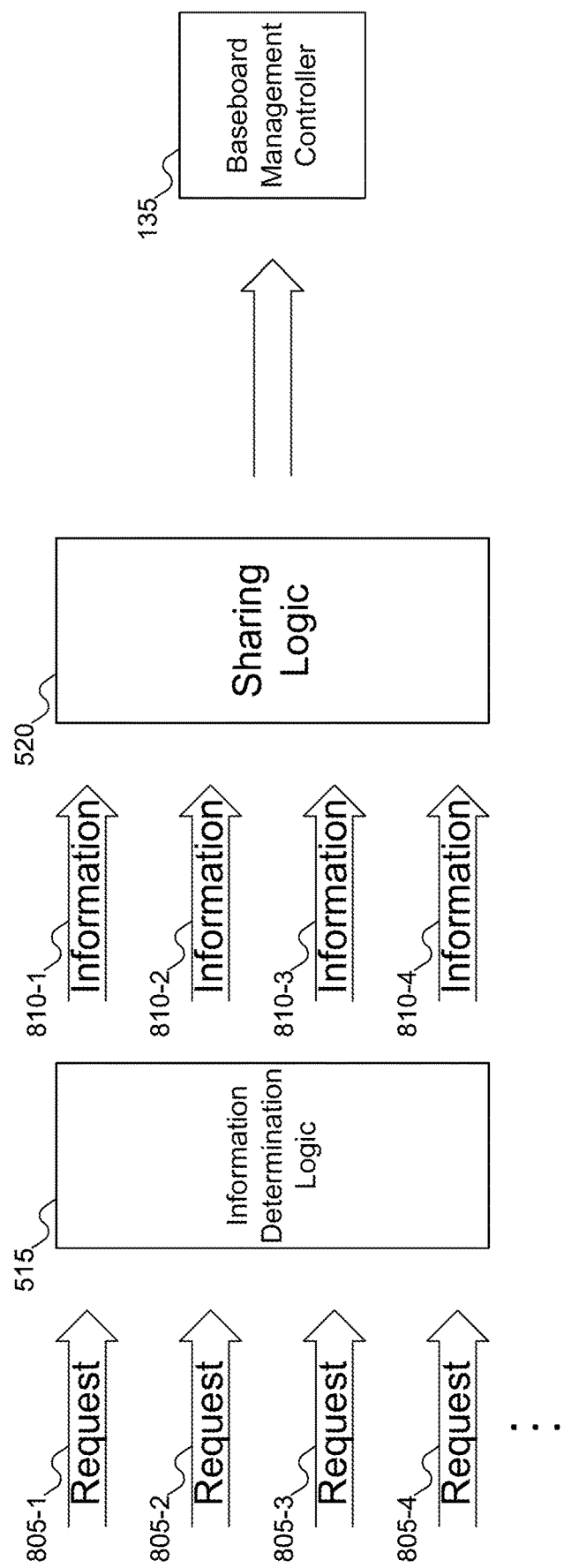
FIG. 8 shows the information determination logic of FIG. 5 gathering information about various requests for delivery to the BMC of FIG. 1.

FIG. 8 shows information determination logic 515 of FIG. 5 gathering information about various requests for delivery to BMC 135 of FIG. 1. As described above, there are many different types of information that may be determined about storage device 120 of FIG. 1, and that may be shared with BMC 135. Some information—such as program fail count 620 of FIG. 6 or erase fail count 625 of FIG. 6—are statistics about storage device 120 of FIG. 1 as a whole. But other information—for example, read latency 610 of FIG. 6 and write latency 615 of FIG. 6—depend on individual requests or requests received by storage device 120 of FIG. 1. Whatever the form the information being measured takes, information determination logic 515 may determine the appropriate information.

In FIG. 8, requests 805-1 through 805-4 are shown being received by storage device 120 of FIG. 1. Information determination logic 515 may determine information 810-1 through 810-4 about these requests. Sharing logic 520 may then share information 810-1 through 810-4 with BMC 135.

While FIG. 8 shows four requests 805-1 through 805-4, embodiments of the inventive concept may support any number of requests. In addition, for information that is determined from storage device 120 of FIG. 1 rather than from individual requests, information determination logic 515 may not need to receive any individual requests 805-1 through 805-4.

The exact implementation of information determination logic 515 will vary depending on the form information 810-1 through 810-4 takes. For example, if information 810-1 through 810-4 measures read latency 610 of FIG. 6 or write latency 615 of FIG. 6, in some embodiments of the inventive concept information determination logic 515 may include a timer to measure the time taken to process requests 805-1 through 805-4 (or alternatively, a clock, storage for the start and end times between processing of a request occurred, and an arithmetic logic unit to subtract the start time from the end time). Alternatively, in other embodiments of the inventive concept information determination logic 515 might include a counter to count a number of times a particular condition, such as a programming or erase operation failed, is met. Still other embodiments of the inventive concept might include sensors to detect when particular conditions, such as thermal conditions, are met. But whatever form information 810-1 through 810-4 might take, information 810-1 through 810-4 is not the result of executing request 805-1 through 805-4: information 810-1 through 810-4 is information about the performance of storage device 120 of FIG. 1 in executing requests 805-1 through 805-4. Note also that while the data returned by storage device 120 of FIG. 1 in response to requests 805-1 through 805-4 would be directed to the application that issued the request (on computer machine 105 of FIG. 1 or some other computer machine connected to computer machine 105 of FIG. 1), information 810-1 through 810-4 would be directed to BMC 135.

Figure 9:
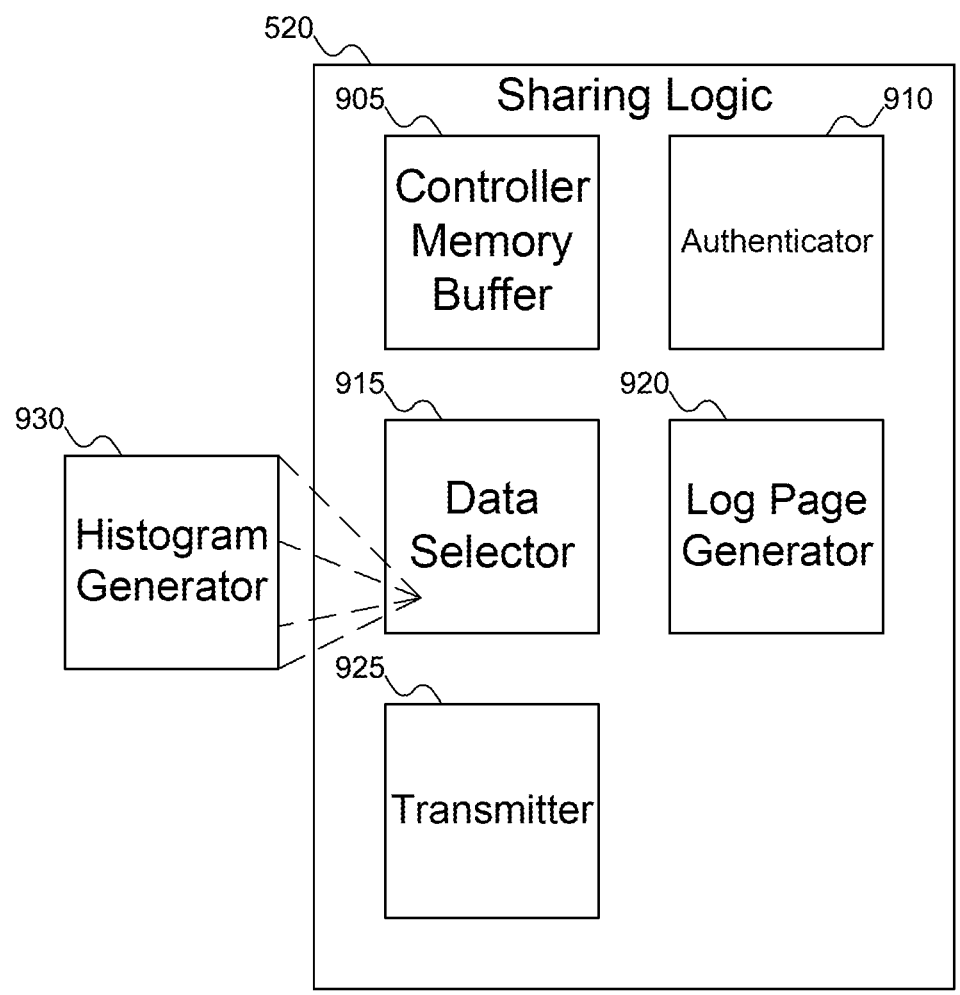
FIG. 9 shows details of the sharing logic of FIG. 5.

FIG. 9 shows details of sharing logic 520 of FIG. 5. FIG. 9 shows sharing logic 520 as including support for both active and passive sharing of information 810-1 through 810-4 of FIG. 8 with BMC 135 of FIG. 1. While some embodiments of the inventive concept may include all the components shown in FIG. 9, other embodiments of the inventive concept might include only those components used to share information with BMC 135 in either active or passive mode, but not both.

Sharing logic 520 may include Controller Memory Buffer (CMB) 905, authenticator 910, data selector 915, log page generator 920, and transmitter 925. CMB 905 may be a storage within storage device 120 of FIG. 1 that may be accessed directly by BMC 135 of FIG. 1. CMB 905 may be implemented in any desired form. For example, CMB 905 may be RAM, such as DRAM. CMB 905 represents an active mode for sharing information with BMC 135: when storage device 120 of FIG. 1 has new information to share with BMC 135, sharing logic 520 may write the new information to CMB 905. Then, BMC 135 may read CMB 905 whenever desired, retrieving the latest information from storage device 120 of FIG. 1.

To prevent unauthorized access to CMB 905, sharing logic 520 may include authenticator 910. Authenticator 910 may determine whether any particular component, such as BMC 135 of FIG. 1, attempting to access CMB 905 is authorized to access CMB 905. For example, authenticator 910 may block access to CMB 905 unless the component requesting access provides an agreed-upon passcode.

While sharing logic 520 may share all information about storage device 120 of FIG. 1, sharing logic 520 may also be selective about what information is shared. Data selector 915 may select the particular information to be shared with BMC 135 of FIG. 1. For example, while storage device 120 of FIG. 1 might collect all possible information about itself, BMC 135 of FIG. 1 might only be interested in read latency 610 of FIG. 6 and write latency 615 of FIG. 6. Data selector 915 may select the information sought by BMC 135 of FIG. 1, so that sharing logic 520 may provide just that information to BMC 135 of FIG. 1.

Data selector 915 may also include histogram generator 930. Histogram generator 930 may generate histogram 705 of FIG. 7, which encapsulates information about storage device 120 of FIG. 1 without sharing logic 520 having to share all of the information.

When storage device 120 of FIG. 1 uses an active mode to share information with BMC 135 of FIG. 1, sharing logic 520 may share all information about storage device 120 of FIG. 1, regardless of the information BMC 135 of FIG. 1 is specifically interested in. But if storage device 120 of FIG. 1 knows what information BMC 135 of FIG. 1 is interested in, data selector 915 may select just that data to be written to CMB 905.

Data selector 915 may also be used when storage device 120 of FIG. 1 uses a passive mode to share information with BMC 135 of FIG. 1. In passive mode, BMC 135 may send a request for information, such as a request for a Log Page, to storage device 120 of FIG. 1. Data selector 915 may then select the information requested by BMC 135 of FIG. 1. Log Page generator 920 may then generate a Log Page containing the requested information, and transmitter 925 may transmit the generated Log Page to BMC 135 of FIG. 1.

Figure 10:
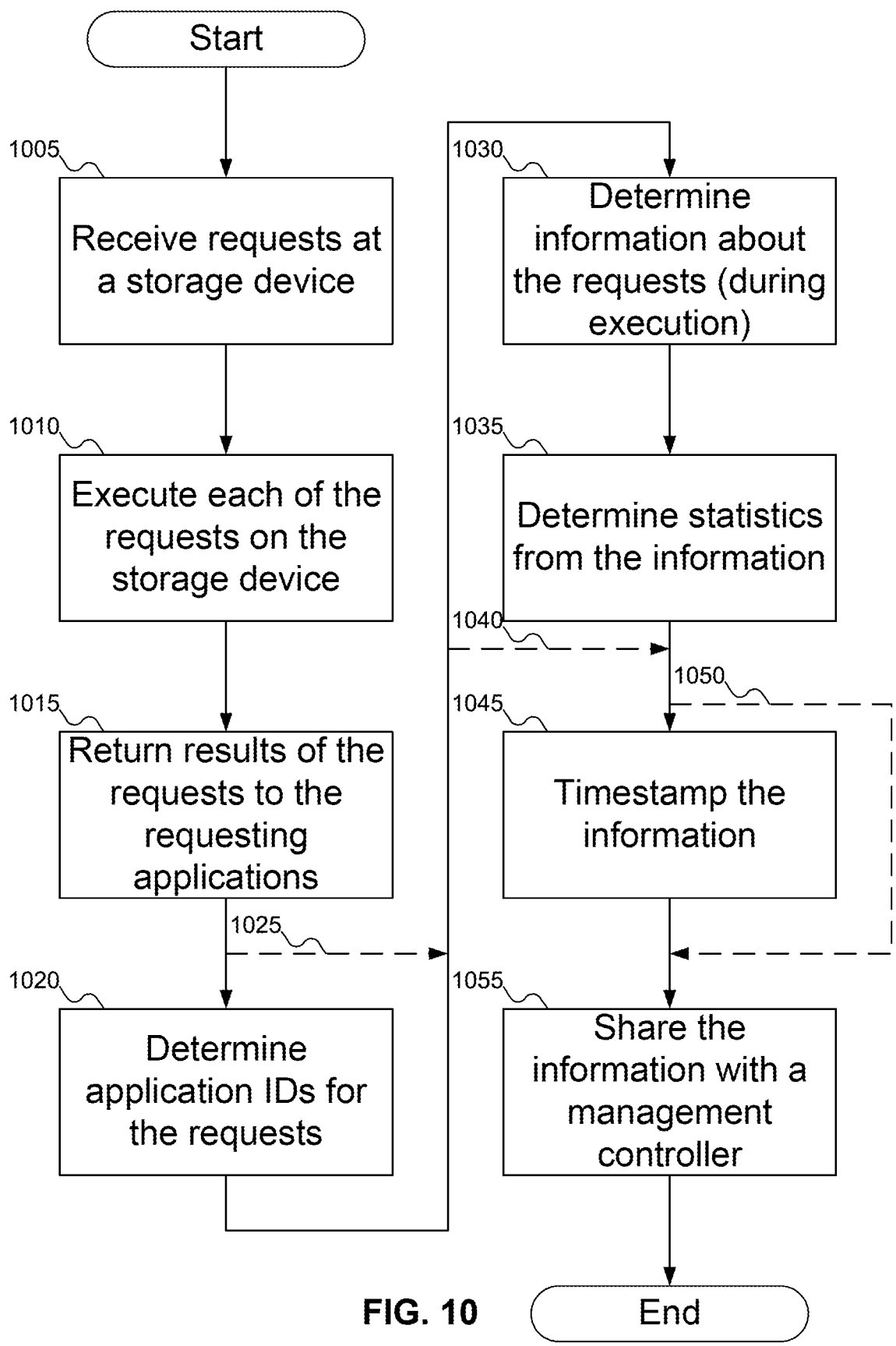
FIG. 10 shows a flowchart of an example procedure for the storage device of FIG. 1 to track information about the performance of the storage device of FIG. 1 and share that information with the BMC of FIG. 1, according to an embodiment of the inventive concept.

FIG. 10 shows a flowchart of an example procedure for storage device 120 of FIG. 1 to track information about the performance of storage device 120 of FIG. 1 and share that information with BMC 135 of FIG. 1, according to an embodiment of the inventive concept. In FIG. 10, at block 1005, receiver 510 of FIG. 5 may receive requests from one or more applications. At block 1010, controller 410 of FIG. 4 may execute the requests. At block 1015, storage device 120 of FIG. 1 may return the results of executing the requests to the requesting application(s). At block 1020, application identifier 530 of FIG. 5 may determine identifiers of application(s) that issued the requests. Block 1020 may be omitted, as shown by dashed line 1025.

At block 1030, information determination logic 515 may determine information about storage device 120 of FIG. 1. This information may be generic to storage device 120 of FIG. 1 or about the individual requests received from the applications. At block 1035, histogram generator 930 of FIG. 9 may generate statistics from the information. Block 1035 may be omitted, as shown by dashed arrow 1040. At block 1045, timestamper 525 of FIG. 5 may timestamp the information determined by information determination logic 515 of FIG. 5. Block 1045 may be omitted, as shown by dashed line 1050. Finally, at block 1055, sharing logic 520 of FIG. 5 may share the information with BMC 135 of FIG. 1.

Figure 11:
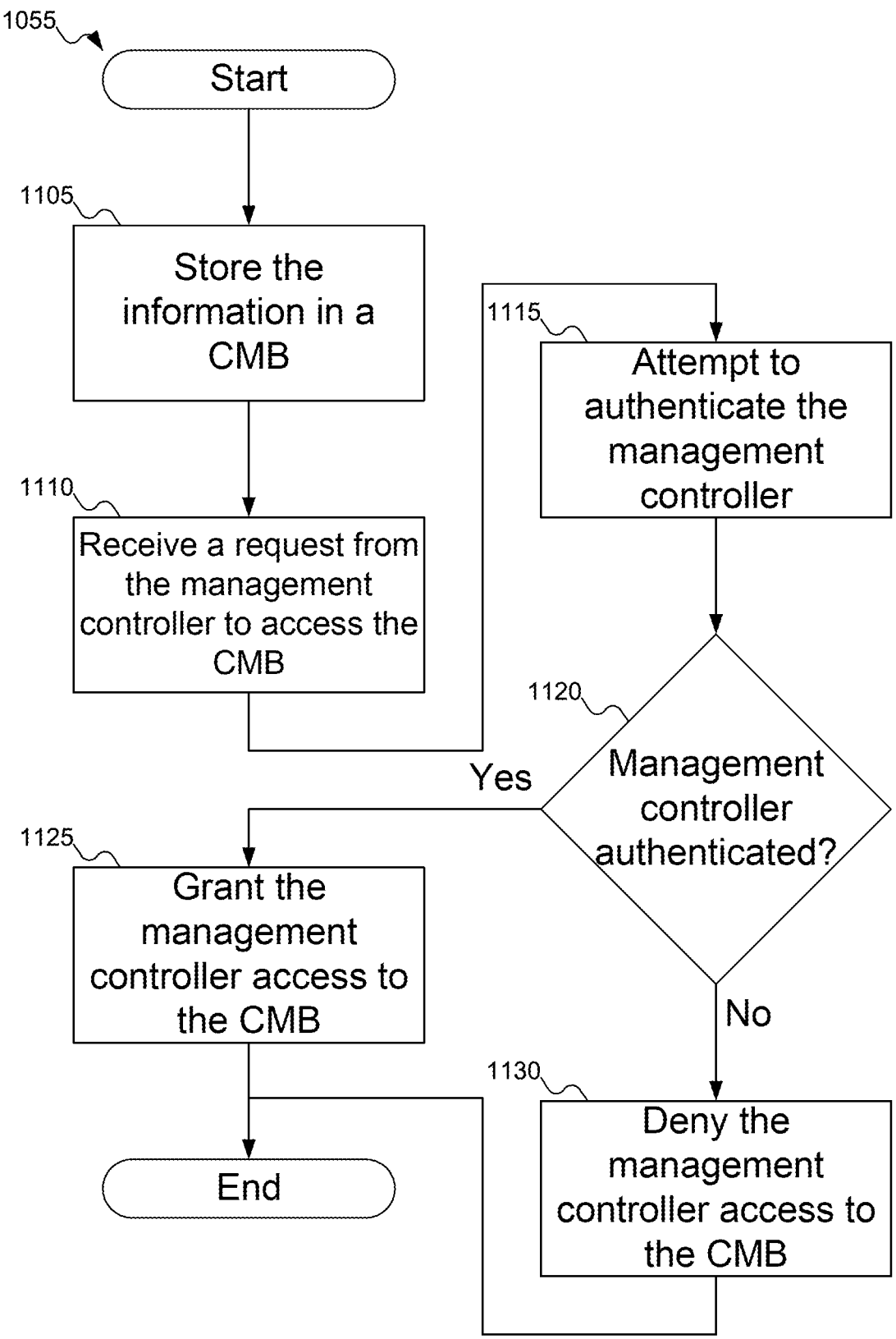
FIGS. 11-12 show flowcharts of example procedures for the storage device of FIG. 1 to share information with the BMC of FIG. 1, according to embodiments of the inventive concept.
Figure 12:
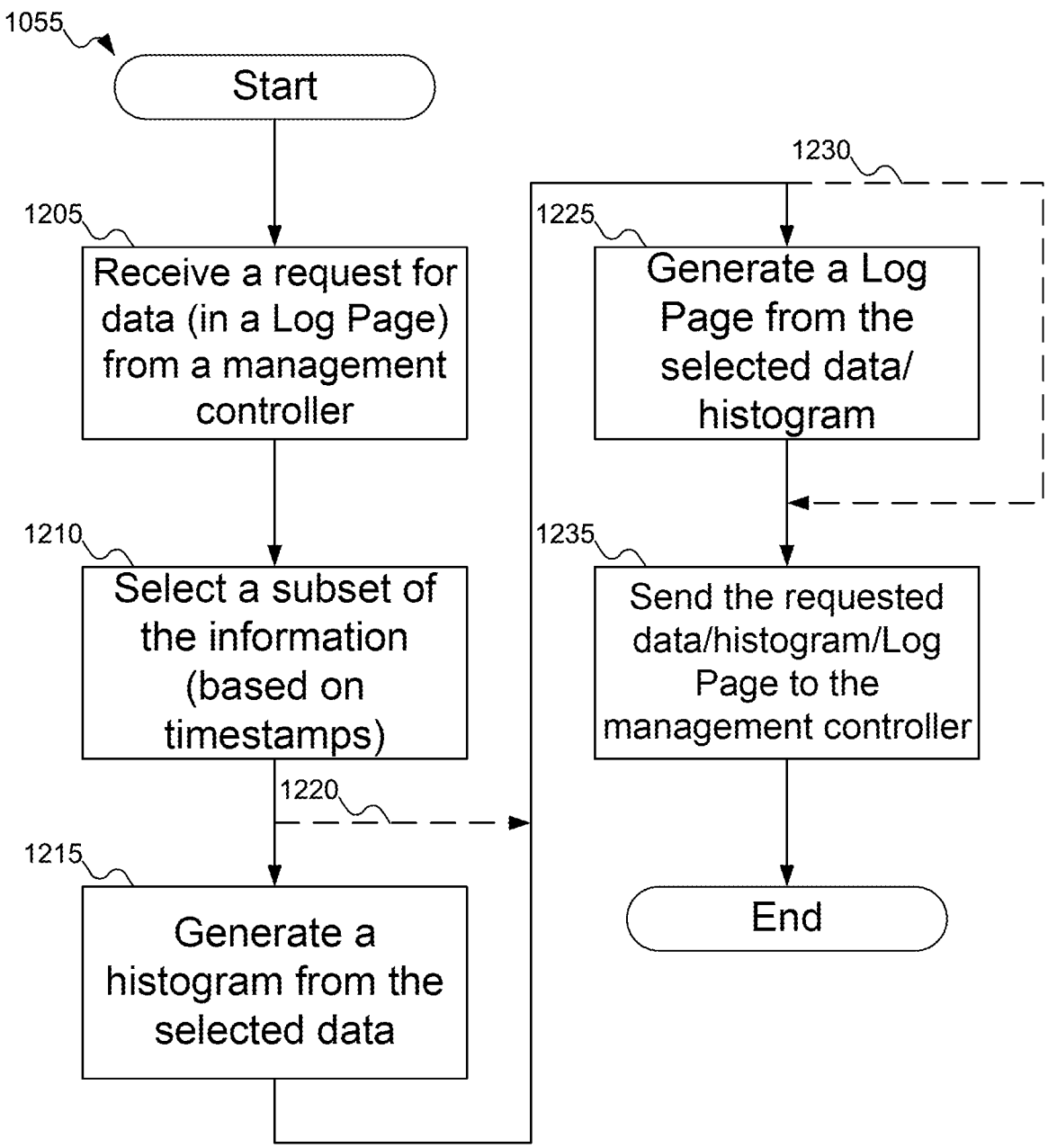

FIGS. 11-12 show flowcharts of example procedures for storage device 120 of FIG. 1 to share information with BMC 135 of FIG. 1, according to embodiments of the inventive concept. FIG. 11 shows storage device 120 of FIG. 1 sharing information with BMC 135 of FIG. 1 using an active mode, according to some embodiments of the inventive concept. In FIG. 11, at block 1105, sharing logic 520 of FIG. 5 may store information in CMB 905 of FIG. 9. At block 1110, authenticator 910 of FIG. 9 may receive a request from BMC 135 of FIG. 1 to access the information in CMB 905 of FIG. 9. At block 1115, authenticator 910 of FIG. 9 may attempt to authenticate BMC 135 of FIG. 1. At block 1120, authenticator 910 of FIG. 9 may determine if BMC 135 of FIG. 1 is authenticated. If so, then at block 1125, sharing logic 520 of FIG. 5 may grant BMC 135 of FIG. 1 access to CMB 905 of FIG. 9. Otherwise, at block 1130, sharing logic 520 of FIG. 5 may deny BMC 135 of FIG. 1 access to CMB 905 of FIG. 9.

FIG. 12 shows storage device 120 of FIG. 1 sharing information with BMC 135 of FIG. 1 using a passive mode, according to some embodiments of the inventive concept. In FIG. 12, at block 1205, sharing logic 520 of FIG. 5 may receive a request for information (potentially as a Log Page) from BMC 135 of FIG. 1. At block 1210, data selector 915 of FIG. 9 may select the information requested by BMC 135 of FIG. 1. At block 1215, histogram generator 930 of FIG. 9 may generate a histogram (or other statistic s) from the information about storage device 120 of FIG. 1. Block 1215 may be omitted, as shown by dashed line 1220. At block 1225, Log Page generator 920 of FIG. 9 may generate a Log Page containing the information requested by BMC 135 of FIG. 1. Block 1225 may be omitted, as shown by dashed line 1230. Finally, at block 1235, transmitter 925 of FIG. 9 may transmit the generated Log Page to BMC 135 of FIG. 1.

In FIGS. 10-12, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, storage, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a storage device, comprising:
storage to store data;
a storage device controller to manage reading data from and writing data to the storage responsive to a plurality of requests, the storage device controller including:
storage for information for a plurality of requests;
a receiver to receive the plurality of requests;
information determination logic to determine information about each of the plurality of requests; and
sharing logic to share the information about each of the plurality of requests with a management controller.

Statement 2. An embodiment of the inventive concept includes a storage device according to statement 1, wherein the management controller includes a Baseboard Management Controller (BMC).

Statement 3. An embodiment of the inventive concept includes a storage device according to statement 1, wherein the storage device includes a Solid State Drive (SSD).

Statement 4. An embodiment of the inventive concept includes a storage device according to statement 3, wherein the SSD supports a Non-Volatile Memory Express Over Fabrics (NVMeoF) protocol.

Statement 5. An embodiment of the inventive concept includes a storage device according to statement 3, wherein the SSD communicates with the management controller over at least one Peripheral Component Interconnect Express (PCIe) lane.

Statement 6. An embodiment of the inventive concept includes a storage device according to statement 5, wherein the SSD receives the plurality of requests over an Ethernet port.

Statement 7. An embodiment of the inventive concept includes a storage device according to statement 1, wherein the information determination logic is operative to determine the information about each of plurality of requests while each of the plurality of requests is executed by the storage device.

Statement 8. An embodiment of the inventive concept includes a storage device according to statement 1, wherein the information are drawn from a set including read latencies, write latencies, program fail counts, erase fail counts, wear level counts, bit error rates, and interface bit error rates.

Statement 9. An embodiment of the inventive concept includes a storage device according to statement 1, wherein:
the information determination logic is operative to determine statistics for the plurality of requests; and
the sharing logic is operative to share the statistics for the plurality of requests with the management controller.

Statement 10. An embodiment of the inventive concept includes a storage device according to statement 1, wherein the sharing logic includes a Controller Memory Buffer (CMB) that may store the information about each of the plurality of requests.

Statement 11. An embodiment of the inventive concept includes a storage device according to statement 10, wherein the sharing logic includes an authenticator to authenticate the management controller before permitting the management controller to access the CMB.

Statement 12. An embodiment of the inventive concept includes a storage device according to statement 1, wherein:
the receiver is operative to receive a request for data from the management controller; and
the sharing logic includes:
a data selector to select the data from the information about each of the plurality of requests; and
a transmitter to transmit the selected data to the management controller.

Statement 13. An embodiment of the inventive concept includes a storage device according to statement 12, wherein:
the sharing logic further includes a Log Page generator to generate a Log Page from the selected data; and
the transmitter is operative to transmit the Log Page to the management controller.

Statement 14. An embodiment of the inventive concept includes a storage device according to statement 12, wherein the selected data is a subset of the information about each of the plurality of requests.

Statement 15. An embodiment of the inventive concept includes a storage device according to statement 12, wherein the data selector includes a histogram generator to generate a histogram from the selected data.

Statement 16. An embodiment of the inventive concept includes a storage device according to statement 1, wherein the storage device controller further includes a timestamper to timestamp the information for each of the plurality of requests.

Statement 17. An embodiment of the inventive concept includes a storage device according to statement 1, wherein the storage device controller further includes an application identifier to determine an application ID for each of the plurality of requests.

Statement 18. An embodiment of the inventive concept includes a storage device according to statement 17, wherein the storage device includes an embedded microprocessor running an application identified by the application ID.

Statement 19. An embodiment of the inventive concept includes a method, comprising:

receiving a plurality of requests at a storage device;

executing each of the plurality of requests on the storage device;

returning results of each of the plurality of requests from the storage device;

determining information for each of the plurality of requests, wherein the information describes a performance of the storage device in executing each of the plurality of requests on the storage device; and sharing the information with a management controller.

Statement 20. An embodiment of the inventive concept includes a method according to statement 19, wherein the management controller includes a Baseboard Management Controller (BMC).

Statement 21. An embodiment of the inventive concept includes a method according to statement 19, wherein the storage device includes a Solid State Drive (SSD).

Statement 22. An embodiment of the inventive concept includes a method according to statement 21, wherein the SSD supports a Non-Volatile Memory Express Over Fabrics (NVMeoF) protocol.

Statement 23. An embodiment of the inventive concept includes a method according to statement 21, wherein sharing the information with a management controller includes sharing the information with the management controller over at least one Peripheral Component Interconnect Express (PCIe) lane.

Statement 24. An embodiment of the inventive concept includes a method according to statement 23, wherein receiving a plurality of requests at a storage device includes receiving the plurality of requests at the SSD over an Ethernet port.

Statement 25. An embodiment of the inventive concept includes a method according to statement 19, wherein determining information for each of the plurality of requests includes determining the information for each of the plurality of requests while executing each of the plurality of the requests.

Statement 26. An embodiment of the inventive concept includes a method according to statement 19, wherein the information are drawn from a set including read latencies, write latencies, program fail counts, erase fail counts, wear level counts, bit error rates, and interface bit error rates.

Statement 27. An embodiment of the inventive concept includes a method according to statement 19, wherein:

determining information for each of the plurality of requests includes determining statistics for the plurality of requests; and sharing the information with a management controller includes sharing the statistics for the plurality of requests with the management controller.

Statement 28. An embodiment of the inventive concept includes a method according to statement 19, wherein sharing the information with a management controller includes storing the information for each of the plurality of requests in a Controller Memory Buffer (CMB).

Statement 29. An embodiment of the inventive concept includes a method according to statement 28, wherein sharing the information with a management controller further includes:

receiving a request from the management controller to access the CMB; and authenticating the management controller.

Statement 30. An embodiment of the inventive concept includes a method according to statement 19, wherein sharing the information with a management controller includes:

receiving a request for data from the management controller;

selecting data from the information for each of the plurality of requests; and sending the data from the information for each of the plurality of requests to the management controller.

Statement 31. An embodiment of the inventive concept includes a method according to statement 30, wherein:

sharing the information with a management controller further includes generate a Log page including the data; and sending the data from the information for each of the plurality of requests to the management controller includes sending the Log Page to the management controller.

Statement 32. An embodiment of the inventive concept includes a method according to statement 30, wherein the data is a subset of the information for each of the plurality of requests.

Statement 33. An embodiment of the inventive concept includes a method according to statement 30, wherein selecting data from the information for each of the plurality of requests includes generating a histogram from the information for each of the plurality of requests as the data.

Statement 34. An embodiment of the inventive concept includes a method according to statement 19, wherein determining information for each of the plurality of requests includes timestamping the information for each of the plurality of requests.

Statement 35. An embodiment of the inventive concept includes a method according to statement 34, wherein sharing the information with a management controller includes selecting the information with a timestamp more recent than an earlier timestamp.

Statement 36. An embodiment of the inventive concept includes a method according to statement 19, wherein determining information for each of the plurality of requests includes determining an application ID for each of the plurality of requests.

Statement 37. An embodiment of the inventive concept includes a method according to statement 36, wherein the application ID identifies an application running on a microprocessor embedded in the storage device.

Statement 38. An embodiment of the inventive concept includes an article, comprising a non-transitory storage medium, the non-transitory storage medium having stored thereon instructions that, when executed by a machine, result in:

receiving a plurality of requests at a storage device;

executing each of the plurality of requests on the storage device;

returning results of each of the plurality of requests from the storage device;

determining information for each of the plurality of requests, wherein the information describes a performance of the storage device in executing each of the plurality of requests on the storage device; and sharing the information with a management controller.

Statement 39. An embodiment of the inventive concept includes an article according to statement 38, wherein the management controller includes a Baseboard Management Controller (BMC).

Statement 40. An embodiment of the inventive concept includes an article according to statement 38, wherein the storage device includes a Solid State Drive (SSD).

Statement 41. An embodiment of the inventive concept includes an article according to statement 40, wherein the SSD supports a Non-Volatile Memory Express Over Fabrics (NVMeoF) protocol.

Statement 42. An embodiment of the inventive concept includes an article according to statement 40, wherein sharing the information with a management controller includes sharing the information with the management controller over at least one Peripheral Component Interconnect Express (PCIe) lane.

Statement 43. An embodiment of the inventive concept includes an article according to statement 42, wherein receiving a plurality of requests at a storage device includes receiving the plurality of requests at the SSD over an Ethernet port.

Statement 44. An embodiment of the inventive concept includes an article according to statement 38, wherein determining information for each of the plurality of requests includes determining the information for each of the plurality of requests while executing each of the plurality of the requests.

Statement 45. An embodiment of the inventive concept includes an article according to statement 38, wherein the information are drawn from a set including read latencies, write latencies, program fail counts, erase fail counts, wear level counts, bit error rates, and interface bit error rates.

Statement 46. An embodiment of the inventive concept includes an article according to statement 38, wherein:

determining information for each of the plurality of requests includes determining statistics for the plurality of requests; and sharing the information with a management controller includes sharing the statistics for the plurality of requests with the management controller.

Statement 47. An embodiment of the inventive concept includes an article according to statement 38, wherein sharing the information with a management controller includes storing the information for each of the plurality of requests in a Controller Memory Buffer (CMB).

Statement 48. An embodiment of the inventive concept includes an article according to statement 47, wherein sharing the information with a management controller further includes:

receiving a request from the management controller to access the CMB; and authenticating the management controller.

Statement 49. An embodiment of the inventive concept includes an article according to statement 38, wherein sharing the information with a management controller includes:

receiving a request for data from the management controller;

selecting data from the information for each of the plurality of requests; and sending the data from the information for each of the plurality of requests to the management controller.

Statement 50. An embodiment of the inventive concept includes an article according to statement 49, wherein:

sharing the information with a management controller further includes generate a Log page including the data; and sending the data from the information for each of the plurality of requests to the management controller includes sending the Log Page to the management controller.

Statement 51. An embodiment of the inventive concept includes an article according to statement 49, wherein the data is a subset of the information for each of the plurality of requests.

Statement 52. An embodiment of the inventive concept includes an article according to statement 49, wherein selecting data from the information for each of the plurality of requests includes generating a histogram from the information for each of the plurality of requests as the data.

Statement 53. An embodiment of the inventive concept includes an article according to statement 38, wherein determining information for each of the plurality of requests includes timestamping the information for each of the plurality of requests.

Statement 54. An embodiment of the inventive concept includes an article according to statement 53, wherein sharing the information with a management controller includes selecting the information with a timestamp more recent than an earlier timestamp.

Statement 55. An embodiment of the inventive concept includes an article according to statement 38, wherein determining information for each of the plurality of requests includes determining an application ID for each of the plurality of requests.

Statement 56. An embodiment of the inventive concept includes an article according to statement 55, wherein the application ID identifies an application running on a microprocessor embedded in the storage device.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A first device, comprising:

a first storage to store data; and a first circuit to manage reading data from or writing data to the first storage based at least in part on a first request and a second request, the first circuit including:

a second storage for a first information about the first request and a second information about the second request; and a second circuit to receive the first request and the second request, wherein the first circuit is configured to determine the first information about the first request and the second information about the second request, and to share the first information about the first request and the second information about the second request with a second device.

2. A first device according to claim 1, wherein the first request is received from a host via a switch, the switch one of an Ethernet switch or a Peripheral Component Interconnect Express (PCIe) switch.

3. A first device according to claim 1, wherein the first circuit is further configured to determine the first information about the first request based at least in part on execution of at least the first request by the first device and to determine the second information about the second request based at least in part on execution of the second request by the first device, wherein the second device is configured to use the first information about the first request to determine a tail latency of the first device and to assign an application to the first device based in part on a requested level of service of the application and the tail latency of the first device.

4. A first device according to claim 1, wherein the first circuit is further configured to determine statistics for the first request and to share the statistics for the first request with the second device.

5. A first device according to claim 1, wherein the first circuit is configured to write the first information to a buffer and the second device is configured to read the first information from the buffer.

6. A first device according to claim 1, wherein:
the second circuit is configured to receive a request for data from the second device; and
the first circuit includes:
a data selector to select the data from the first information about the first request; and
a third circuit to transmit the selected data to the second device.

7. A first device according to claim 1, wherein the first circuit further includes a third circuit to timestamp the first information about the first request.

8. A first device according to claim 1, wherein the first circuit further includes a third circuit to determine an application ID associated with the first request.

9. A first device according to claim 8, wherein the first device includes a processor running an application identified by the application ID.

10. A method, comprising:
receiving a first request at a first device from a host;
executing the first request on the first device;
returning a first result of the first request from the first device to the host;
receiving a second request at the first device from the host;
executing the second request on the first device;
returning a second result of the second request from the first device to the host;
determining a first information about the first request and a second information about the second request, wherein the first information includes a first performance of the first device in executing the first request on the first device and the second information includes a second performance of the first device in executing the second request on the first device; and
sharing the first information and the second information with a second device.

11. A method according to claim 10, wherein receiving the first request at the first device from the host includes receiving the first request at the first device from the host via a switch, the switch one of an Ethernet switch or a Peripheral Component Interconnect Express (PCIe) switch.

12. A method according to claim 10, wherein determining the first information about the first request and the second information about the second request includes determining the first information about the first request based at least in part on execution of the first request by the first device, wherein the second device is configured to use the first information about the first request to determine a tail latency of the first device and to assign an application to the first device based in part on a requested level of service of the application and the tail latency of the first device.

13. A method according to claim 10, wherein sharing the information with the second device includes storing the first information about the first request in a buffer, wherein the second device is configured to read the first information from the buffer.

14. A method according to claim 13, wherein sharing the information with the second device further includes:
receiving a request from the second device to access the buffer; and
authenticating the second device.

15. A method according to claim 10, wherein sharing the information with a second device includes:
receiving a request for data from the second device;
selecting data from the first information about the first request; and
sending the data from the first information about the first request to the second device.

16. A method according to claim 10, wherein determining the first information about the first request and the second information about the second request includes timestamping the first information about the first request.

17. A method according to claim 16, wherein sharing the information with the second device includes selecting the first information with a timestamp more recent than an earlier timestamp.

18. A method according to claim 10, wherein determining the first information about the first request and the second information about the second request includes determining an application ID associated with the first request.

19. An article, comprising a non-transitory storage medium, the non-transitory storage medium having stored thereon instructions that, when executed by a machine, result in:
receiving a first request at a first device from a host;
executing the first request on the first device;
returning a first result of the first request from the first device to the host;
receiving a second request at the first device from the host;
executing the second request on the first device;
returning a second result of the second request from the first device to the host;
determining a first information about the first request and a second information about the second request, wherein the first information includes a first performance of the first device in executing the first request on the first device and the second information includes a second performance of the first device in executing the second request on the first device; and sharing the first information and the second information with a second device.

20. An article according to claim 19, wherein receiving the first request at the first device from the host includes receiving the first request at the first device from the host via a switch, the switch one of an Ethernet switch or a Peripheral Component Interconnect Express (PCIe) switch.

* * * * *